(12) United States Patent
Royle et al.

(10) Patent No.: US 6,617,856 B1
(45) Date of Patent: Sep. 9, 2003

(54) ELECTRONIC MARKER LOCATOR SYSTEM AND METHOD

(75) Inventors: John Mark Royle, Exeter (GB); Richard David Pearson, Bristol (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 10/076,089

(22) Filed: Feb. 15, 2002

(51) Int. Cl.[7] .......................... G01V 3/08; G01R 19/00
(52) U.S. Cl. .................................. 324/329; 324/67
(58) Field of Search .......................... 324/326–329, 324/225, 233, 67, 207.17; 340/572.1–572.5; 175/45; 702/94, 106

(56) References Cited

U.S. PATENT DOCUMENTS

| | | | | |
|---|---|---|---|---|
| 3,719,882 A | * | 3/1973 | Pincus ........................ | 324/330 |
| 5,001,430 A | * | 3/1991 | Peterman et al. ........... | 324/326 |
| 5,093,622 A | * | 3/1992 | Balkman .................... | 324/326 |
| 5,194,812 A | * | 3/1993 | Yokoi ......................... | 324/326 |
| 5,420,514 A | * | 5/1995 | Wardle et al. .............. | 324/615 |
| 6,140,819 A | * | 10/2000 | Peterman et al. ........... | 324/326 |
| 6,477,148 B1 | * | 11/2002 | Gardenfors et al. ........ | 370/280 |

* cited by examiner

Primary Examiner—N. Le
Assistant Examiner—Reena Aurora
(74) Attorney, Agent, or Firm—Baker & Hostetler LLP

(57) ABSTRACT

A system and method to locate electronic marker balls includes receiving a signal representative of a detected marker ball. The signal includes the resolved in-phase and quadrature-phase (I and Q) components, each centered about a first frequency. The I and Q components are filtered in order to shift the first frequency to a second frequency and match the second frequency I and Q components to exponential decay characteristics associated with the marker balls. The second frequency I and Q components phase integrated in order to distinguish the components from noise. The integrating is based upon predetermined gain coefficients and produces integrated I and Q components in accordance with the predetermined gain coefficients. Next, a magnitude of the integrated I and Q components is determined to produce an I and Q magnitude vector and a noise variance associated with the magnitude vector is determined. Finally, the recursive coefficients are adjusted in accordance with the determined noise variance.

20 Claims, 4 Drawing Sheets

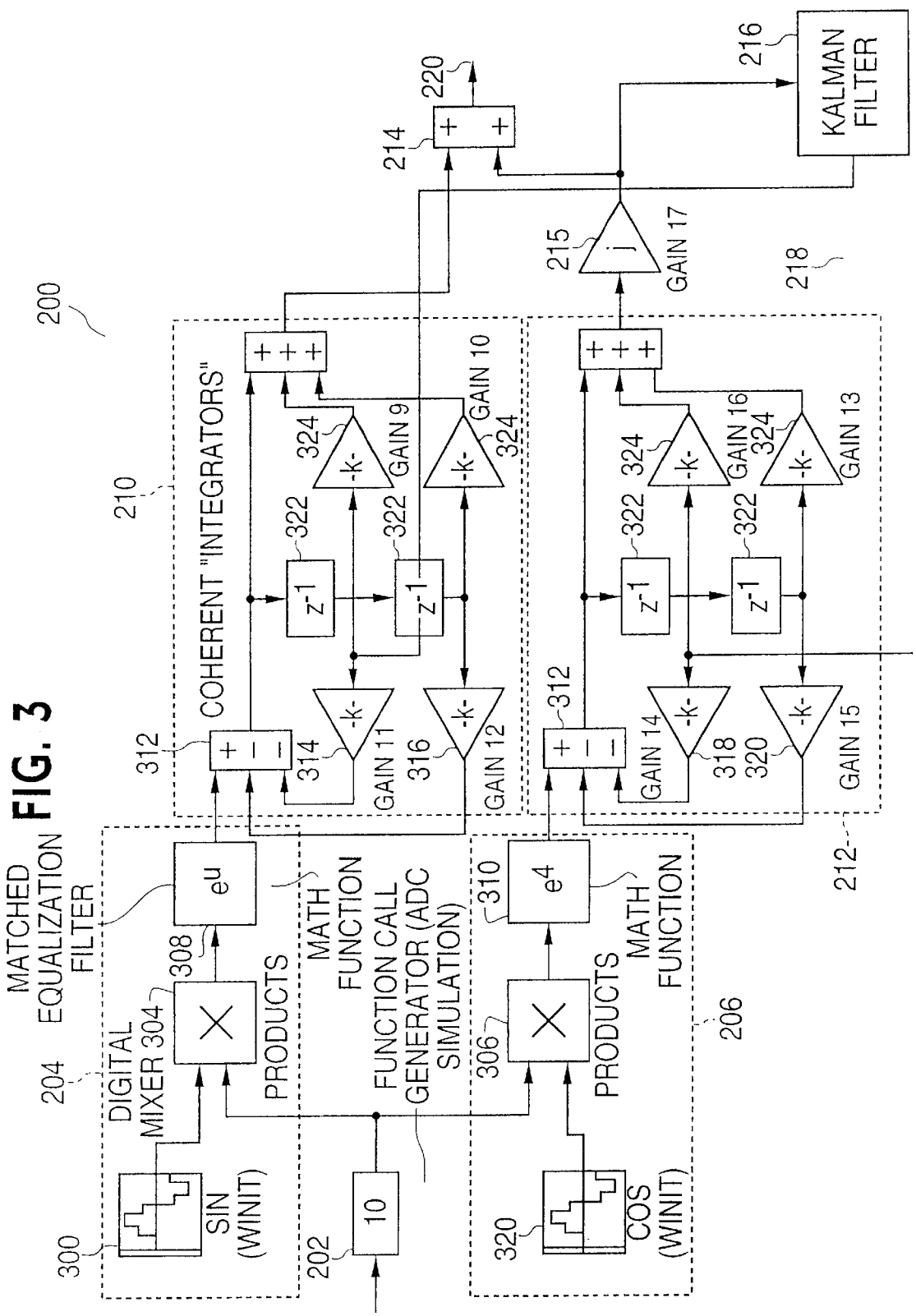

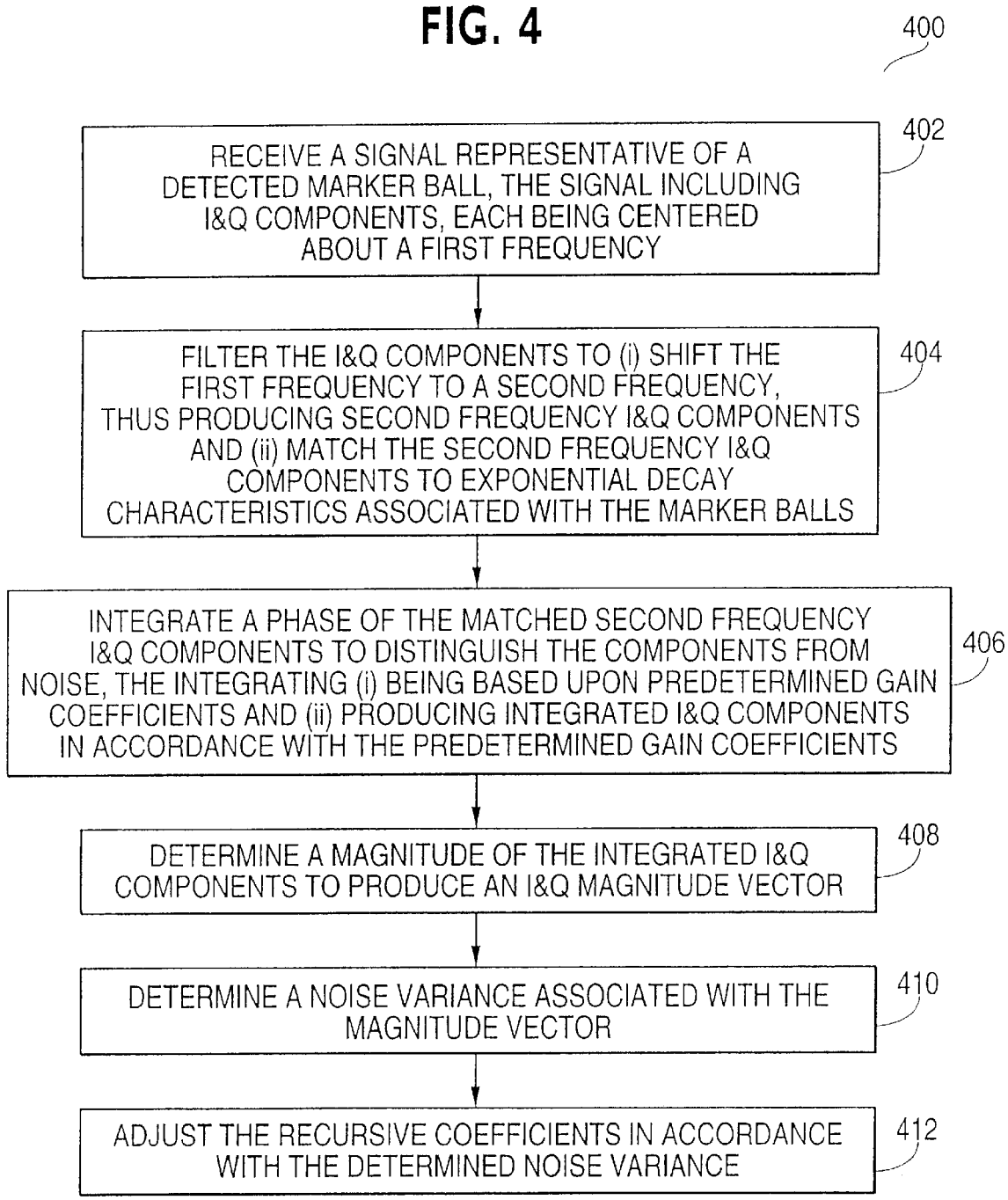

ELECTRONIC MARKER LOCATOR SYSTEM AND METHOD

BACKGROUND OF THE INVENTION

1. Field of the Invention

The present invention relates generally to the field of pipe and cable detection devices.

2. Related Art

Pipe and cable detection devices, or simply detection devices, perform a number of operations relating to the detection of underground objects. These operations include locating and tracing underground cables, pipes, wires, or other types of conduits. Characteristics of underground objects, such as the depth of the object, the magnitude and direction of an electric current passing through the object, and path of the object, can also be determined by locators. Thus, the routine operations and functioning of underground objects can be monitored and defects in these objects can be easily detected.

Detection devices use radio frequency radiation to detect underground objects and their characteristics. A detection device often includes a transmitter and receiver. In an active mode, the transmitter emits a signal at one or more active radio frequencies. The transmitter can be positioned in different ways to generate a signal that can be used to detect an object. For example, a transmitter can apply a signal to an object through induction, direct connection, or signal clamping. The receiver detects the transmitted signal and processes the detected signal to obtain desired information. In a passive operating mode, the receiver can detect passive radio frequency signals emitted by the underground object: A receiver can also detect a SONDE. A SONDE is self-contained transmitter provided on certain types of underground objects, such as non-metallic objects. Examples of commercially-available pipe and cable detection devices are locators and tools available from Radiodetection, Ltd., a United Kingdom company. Detection devices and tools from Radiodetection, Ltd. include devices such as the PXL-2, PDL-2, HCTx-2, LMS-2, LMS-3, PDL-4, PTX-3, and C.A.T. products.

One particular technique for detecting underground objects, such as the cables, pipes, wires, or other conduits include the use of electronic marker balls. Electronic marker balls are passive tuned LC circuits with different resonant frequencies used to denote the various buried utilities (power, water, sanitary, telephone, gas and cable television). The marker balls, typically enclosed in plastic, are buried along with the utilities at depths of up to two meters below the surface.

In order to detect the electronic marker balls, conventional locators accommodate optional sub-assembly devices for performing locate functions. These electronic marker ball locators function as a ground penetrating radar system, transmitting a burst of electromagnetic energy (principally B-field) at the resonant frequency of the marker ball and processing the reflected signal with respect to any background noise level. Conventional electronic marker ball locators typically process incoming signals using a vertical antenna and pre-amplifier for receiving specific resonant frequency signals associated with the marker ball and include a homodyne mixer to shift the signal spectrum of the received signals down to a band close to direct current level (DC).

The problem with this approach is that signals associated with the mixer drivers couple to the receive antennas, therefore appearing as unwanted in-band signals. This seriously erodes the signal-to-noise (SIN) ratio of the receiver. Although heterodyne mixers have been used as an alternative approach in other applications, a heterodyne mixer would not be appropriate to this application due to the frequency tolerance of the marker balls. Also, in the conventional signal processing approaches, the proximity of the induction loop to the permeable antenna core causes antenna saturation. Another problem is created by the effects of DC offsets in the signal processing path. Finally, some of the conventional approaches also suffer from one-half least significant bit (LSB) noise truncation.

What is needed, therefore, is an electronic marker locator device that can ameliorate the shortcomings of the conventional approaches. Specifically, what is needed is an approach that can provide an improvement to the S/N ratio and prevent unwanted antenna coupling. Additionally, an approach is needed that can reduce the effects of antenna saturation, negate the effects of DC offsets, and minimize the one-half LSB noise truncation.

SUMMARY OF THE INVENTION

Consistent with the principles of the present invention as embodied and broadly described herein, an exemplary method for locating electronic marker balls includes receiving a signal representative of a detected marker ball, the signal including resolved in-phase and quadrature-phase (I and Q) components, each signal being centered about a first frequency. Filtering of the I and Q components is provided to (i) shift the first frequency to a second frequency, thus producing second frequency I and Q components and (ii) match the second frequency I and Q components to exponential decay characteristics associated with the marker balls. Next, a phase of the matched second frequency I and Q components is integrated to distinguish the components from noise. The integrating is based upon predetermined gain coefficients and produces integrated I and Q components in accordance with the predetermined gain coefficients. The method also includes determining a magnitude of the integrated I and Q components to produce an I and Q magnitude vector, determining a noise variance associated with the magnitude vector, and adjusting the predetermined gain coefficients in accordance with the determined noise variance.

Features and advantages of the present invention include providing a digital technique to capitalize on signal processing which would be either impossible or impractical in the analogue domain associated with the conventional approaches. Specific advantages include matched filtering for ensuring maximum correlation with the reflected electronic marker ball signal. This improves the S/N ratio by typically 10 dB.

Next, the technique of the present invention facilitates the use of an adaptive Kalman filter to further enhance the S/N ratio by an additional 6 dB. The Kalman filter, as implemented in the present invention, is designed to adapt the $2^{nd}$ order recursive coefficients in a infinite impulse response (IIR) bi-quadratic filter.

The present invention also facilitates a dual mode locate feature. In dual mode the receiver performs a narrow band locate function simultaneously with an electronic marker ball locate function. This simultaneous operation avoids cross-talk between the two receiving systems, that is, between the electronic marker ball locate system signal coupling to the narrow band and vice versa. In the case of the digital electronic marker ball locate system technique used in the present invention, the marker ball locate system frequency response can be steered away from the continuous wave line frequency. The technique uses an adaptive filter to ensure the narrow band frequency falls on a natural zero in the response of the marker ball locator system receiver. In the present invention, this avoidance is controlled via the decimation ratio used in a low pass filter.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated in and constitute a part of the specification, illustrate embodiments of the invention and, together with the general description given above and the detailed description of the embodiments given below, serve to explain the principles of the present invention. In the drawings:

FIG. 3 is a more detailed block diagram illustration of the receive module of FIG. 2; and FIG. 4 is a flow chart of an exemplary method of locating marker balls according to the present invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware, and/or the entities illustrated in the figures. Any actual software code with specialized controlled hardware to implement the present invention is not limiting of the present invention. Thus, the operation and behavior of the present invention will be described with the understanding that modifications and variations of the embodiments are possible, given the level of detail presented herein.

As stated above, an exemplary embodiment of the present invention includes a digital transceiver using a matched filter and a Kalman filter to increase the SIN ratio of the received electronic marker ball signal. The matched filter and Kalman filter will be discussed in greater detail below.

Figure 1:
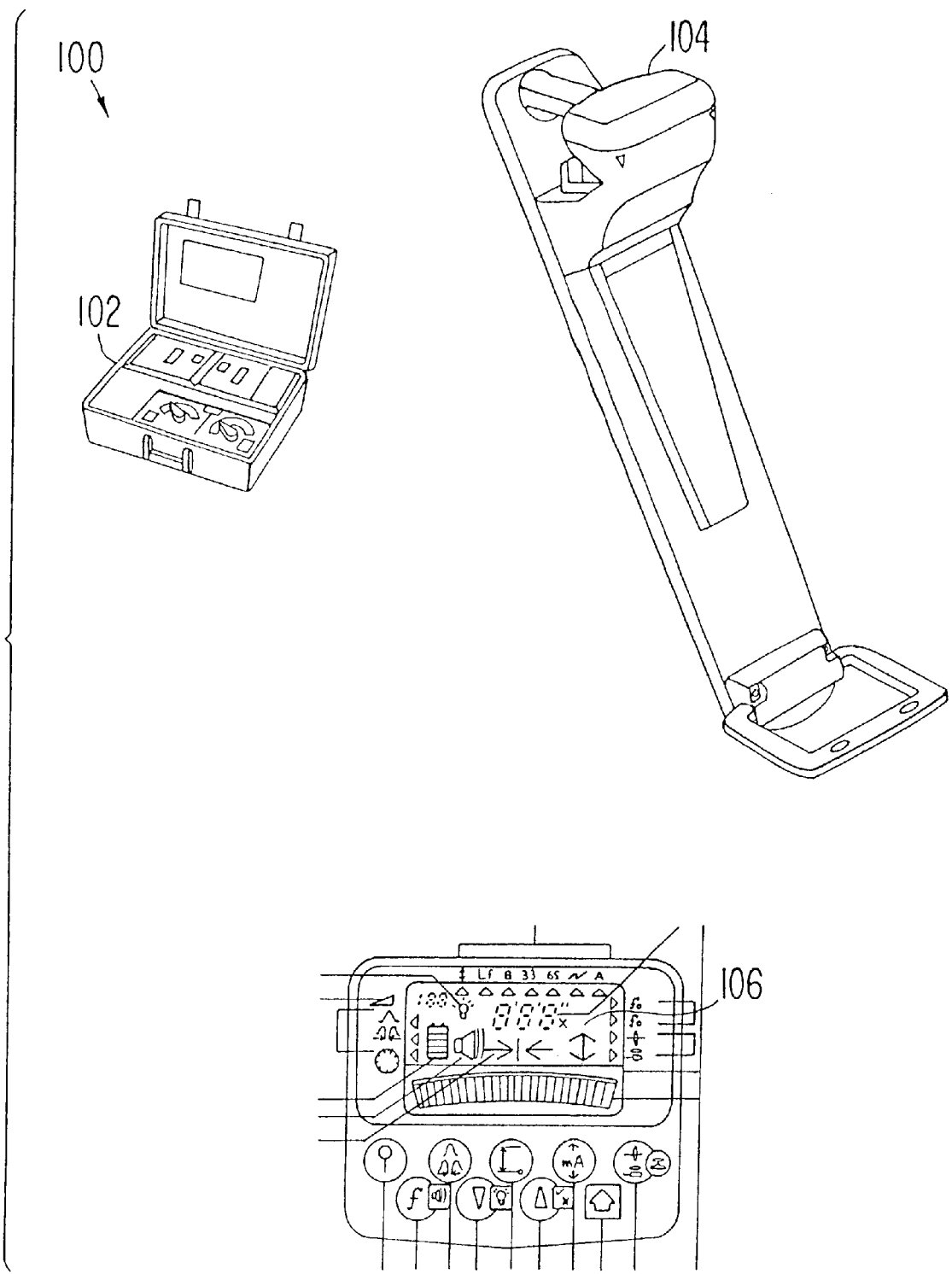
FIG. 1 is an illustration of an exemplary detection device including an electronic marker ball locator.

In FIG. 1, an exemplary pipe and cable detection device 100 includes a transmitter 102 and a receiving module 104. The receiving module 104 is configured to include an optional electronic marker locator digital transceiver 106. The locator device 100 is controlled by a digital signal processor (DSP) 201, described more fully in the discussion of FIG. 2.

Figure 2:
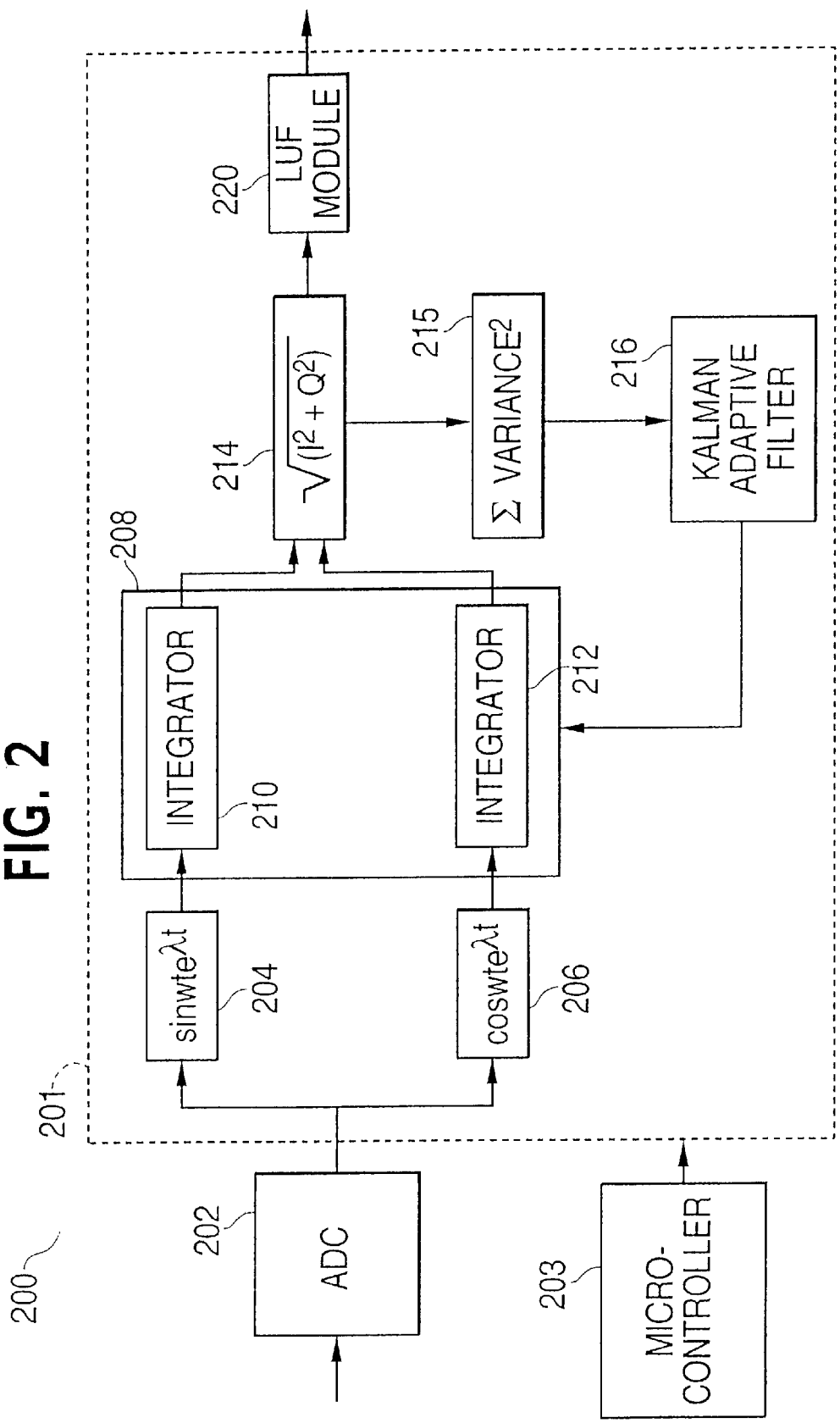
FIG. 2 is a diagram of an exemplary electronic marker ball locator receive module constructed and arranged in accordance with the present invention.

FIG. 2 illustrates an exemplary electronic marker ball locator receive module 200. The receive module 200 includes the DSP 201, an analog-to-digital converter (ADC) 202, and a microcontroller 203, which controls the operations of the DSP 201. Although any suitable DSP can be used, the DSP 201 used in the present embodiment is a 32-bit floating point processor capable of computation up to 100 MFLOPS. In this application the computation is restricted to 25 MHz which helps to keep reduce power consumption. Signals are processed with an effective resolution corresponding to 24-bits this being the format of the floating point representation (24-bit mantissa+8 bit exponent).

The DSP 201 is responsible for all the high rate data computation for the purposes of defining the frequency response and selectivity of the marker ball locate system, and is clocked directly from a programmable system clock.

The DSP 201 takes power from the +3.3V rail (15 mA) for the external I/O and from +1.8V (20 mA) for the central processing unit (CPU) core. The reset pin is controlled by the microcontroller 203 with a minimum reset period of 50 µs.

The transceiver 106 functions in two modes of operation. The DSP 201 is clocked at about 24 times the applicable marker ball frequency. This implies it can execute about 120 op-codes in one period of the marker oscillation. In order to maximize the bandwidth of the ADC 202 it is necessary to program a variable number of wait states plus additional instructions to allow the sample rate to be as close to 1.25 MHz as possible.

The digital transceiver 106 includes a transmitter (not shown) and a receiver, that will be discussed in greater detail below. First the transceiver functions as a dedicated electronic marker locator. Maximum sensitivity is achieved when the system is locating marker-balls with no other locate operations enabled. Next, the electronic marker locator device performs a dual mode locate function. Here, it performs a null locate in a narrow band mode simultaneously with a separate marker ball locate function. In this mode the operator, for example, is presented with the left & right arrows on a display panel, to trace the narrow band signal, for example, from a pipe or cable, while a bar-graph indication and audio feature indicate the signal strength as reflected from the marker-ball. Although the transceiver includes both a transmitter and a receiver, the present application will focus primarily on the receiver.

As stated above, the receive module 200 of FIG. 2 also includes the ADC 202, which can be implemented using any suitable ADC design. In the exemplary embodiment shown in FIG. 2, however, the ADC 202 is a 14-bit flash ADC which samples the filtered antenna signals at ~1.25 MHz.

The marker-ball signal amplitude is transduced via an 8-bit digital-to-analog converter (DAC) (not shown). Matched filtering and predetermined parameters for the ADC 202 sampling, facilitates frequency domain steering to prevent the cross-talk, as addressed above, and discussed in greater detail below.

The ADC 202 also incorporates a wide band sample-and-hold amplifier (SHA) plus four stages of pipelined flash A/D conversion. The digital conversion follows band-pass filters and switched gain stages. An op-amp follower ensures a low impedance signal into the ADC 202 and helps to reduce the effects of inrush current during the sampling event. An anti-alias filter is intrinsic to the low pass filter stages of the band-pass filters (corner frequency at 200 kHz). The ADC 202 input is not self biasing and therefore it is biased to mid-rail (+2.5V) by the analogue signal conditioning.

The ADC 202 has been chosen as it provides a solution which matches the bandwidth and resolution requirements whilst remaining within budget on power and cost. This 14-bit, 1.25 MSPS device has a pipelined architecture with integral sample-and-hold amplifier and flash converter. The device operates from a single 5V rail and its digital outputs can interface to 3V logic.

The digital interface is memory mapped to the DSP 201 and the sampling is controlled in time by a frequency synthesizer. A sampling rate of about 1.25 MSPS is desirable. This high sample rate is justified by consideration of the bandwidth requirements, where, in worst case conditions (maximum distance from the marker-ball), the marker signature is discernible above the one-half LSB noise floor for only 10 $\mu$S. This figure sets the Nyquist frequency for the ADC 202 at 300 kHz and implies the design aim is to achieve 4 times over sampling. The exact figures for the sampling frequency depend on the marker-ball frequency and the associated constraint to the frequency synthesizer.

The DSP 201 controls the ADC 202 sampling at a rate which is as close to 1.25 MSPS as possible for the applicable mode of operation. The sampling is performed in bursts with a fixed number of data samples loaded to memory after each burst from the transmitter (typically 250 samples). The number of samples per burst may vary depending on the operating mode and is controlled by the microcontroller 203 in accordance with known command protocols.

A programmable delay is inserted between the end of the transmitter burst and the start of the ADC 202 sampling. This delay allow various transients signals, which are induced in the antenna by the transmitter output, to decay before the marker signal can be resolved. The delay can programmed from 2 ls to 65 ls with a resolution of 0.1 ls. The delay is controlled numerically via the microcontroller 203 command protocol. Once programmed, it is essential to keep this delay fixed as it determines the phase which the coherent integrators, discussed below, lock in on. For this reason, interrupts must be processed by a handler having fixed interrupt latency and the process time has to be compensated for precisely.

The drive waveforms input to the transmitter are either square wave, modulated square wave with the $3^{rd}$ harmonic component, or super modulated which has $3^{rd}$ or $5^{th}$ harmonic component, absent. The fundamental carrier frequency in each case is substantially equal to the resonant frequency of the applicable marker. The real-time reference for this frequency is the frequency synthesizer, which is configured to drive a re-loading counter in the DSP 201. The synthesizer frequency will be about 24 times the applicable marker-ball frequency.

The ADC 202 of the present invention receives a resonant analog signal representative of an electronic marker ball and produces a number of digital signals in response to the received analog signal. The ADC 202 samples are finite burst signals and are provided as outputs to matched filter devices 204 and 206.

The matched filter devices 204 and 206 are configured to perform sine and cosine multiplication functions in order to shift the center of the carrier signal spectrum down to a band that is close to DC. The sine and cosine phase ensure that the marker signal amplitude can be resolved for any angle. These signals are known in the art as I and Q signals, to denote in-phase and quadrature-phase components.

Sine and cosine data, used in the matched filter devices 204 and 206, can be generated in a number of ways. First, any type of digital phase-quadrature oscillator can be used. One example digital phase-quadrature oscillator which can be used is described in Royle, "Digital Phase-Quadrature Oscillator,"filed on Feb. 15, 2002 and incorporated by reference herein in its entirety. Alternatively, sine and cosine wave data can be generated in a wave-table, implemented, for example, by a 120 point look-up function clocked in real-time by the frequency synthesizer. The cosine phase is be derived from a 24 sample phase shift with respect to sine component.

In the present exemplary embodiment shown in FIG. 2, the matched filter device 204 performs the sine wave multiplication and the matched filter device 206 performs the cosine wave multiplication. Matched filtering is performed to shift the frequency spectrum from the carrier frequency, down to the base-band frequency, close to DC, and match the exponential decay to a known exponential decay of the marker. This process essentially creates a filter whose autocorrelation maximizes on the unique exponential decay of the electronic marker. The exponential decay feature is implemented through use of an additional term in the multiplication process. In other words, the I and Q signals are processed through exponential multipliers which serve to equalize the natural decay of the signal amplitude.

The exponent coefficient ($e^{\lambda t}$), shown in the matched filter devices 204 and 206, is matched to the decay coefficients of an average marker ball. This coefficient is to be optimized for each frequency to match the variation in the q-factor (LCR resonance) of each type of marker-ball. When the transmitter is active, the marker-ball will build-up a progressive resonance, or exponential increase. Once the transmitter has completed a given burst, the marker-ball will adjust to its exact resonant frequency and the amplitude will decay exponentially. The burst of ADC 202 samples is controlled at an exact delay with respect to the last pulse from the transmitter. The outputs of the matched filter devices 204 and 206 are provided to an input of a phase sensitive bi-quadratic integrator 208.

The bi-quadratic integrator 208 includes a sine component 210 and a cosine component 212 and is configured to integrate a phase of the matched second frequency I and Q components created in the matched filters 204 and 206 The integration takes advantage of the fact that a unique phase relationship exists between the signal that is received from the marker, which is also unique, to any other unwanted signal that happens to be at the same frequency. Thus by integrating the phase, with phase being the integral of frequency in the time domain, the desired signal can be brought up or distinguished from the noise floor. This process, also know as phase locked integration, capitalizes on the unique phase relation between the phase of the marker, the phase of the transmitter, and the phase of the other signals. Although phase locked integration is a technique used in some conventional devices, the magnitude component output from the integrator is the component of interest. Any resulting phase information is ultimately discarded through a downstream summation of the I and Q components.

Selective filtering performed by the integrator 208 is achieved by a process of coherent integration. The selectivity in the frequency domain is very poor for a wide-band process, however signals from successive bursts present a fixed phase in the ADC 202 sampling window. An integrator will therefore lock-on to signals which maintain this fixed phase and will 'lift' the marker signal from the noise floor. To maximize the S/N ratio, it is necessary to organize the ADC 202 sampling, such that an unwanted signal in the environment of equal frequency to the marker ball, is naturally rejected by the sampling window (ie the sampling window is an exact integer number of wave periods). The coherent integration is performed by a bi-quadratic IIR filter with a transfer function Y(f):

$$Y(f) := \frac{\sum_{n=0}^{2} b_n \cdot Z(f)^{(-n)}}{1 + \sum_{m=1}^{2} a_m \cdot Z(f)^{(-m)}} \quad Z(f) := e^{\left(2 \cdot \pi \cdot i \cdot \frac{f}{f_s}\right)}$$

where: $a_m$ is the recursive coefficient set
$b_n$ is the non-recursive coefficient set
f is frequency
fs is sampling frequency ~1.25 MSPS
This filter is optimized in the following manner:
(a) The integrators are inherently low-pass filters (response function 1/f) and this will determine both the selectivity and step response of the receiver;
(b) The ratio of the 'feed-through' and 'feed-back' coefficients will determine the gain of the integrator. The filter requires to be auto-regressive in nature, in other words the value held by the integrator must decay naturally through the 'feed-through' coefficients;
(c) Filter optimization will best be achieved by collectively changing the first and second order 'a' and 'b' coefficients;
(d) A second 'in-line' bi-quadratic is beneficial; and
(e) Kalman Adaptive filters, discussed below, may be used to provide a small benefit to the Signal-to-Noise Ratio. The output of the bi-quadratic integrator 208 is provided to a magnitude detection device 214.

The magnitude detection device 214 performs a simple vector operation. More specifically, the I and Q components are combined into a single magnitude using, for example, the vector equation $|S|=\sqrt{I^2+Q^2}$. One output of the magnitude detection device 214 is provided to a look up function (LUF) module 220. The LUF module 220 is the final stage of signal processing and serves to map the magnitude response of the received marker signal to a bar-graph deflection and audio output, which are presented to a system user. A starting point for this function is a 50 point look-up function which follows an inverse sixth power law, this matches the intrinsic depth dependency of the transceiver. The bar graph signal is output via the 10-bit DAC at an update rate of about 200 Hz. The DAC scaling is such that 10-bits is equivalent to about 3.0V.

Another output of the magnitude detection device 214 is provided to a variance summing junction 215, which performs a further summing operation. The resultant signal is provided to an adaptive filter 216 filtering. Although any suitable filter can be used, the present exemplary embodiment uses an adaptive Kalman filter because of its ability to further provide further enhancements to the S/N ratio.

Kalman filter 216 is designed to adapt to second order recursive coefficients in the IIR bi-quadratic filter. The natural trade-off of this process is the loss some of the ballistic response characteristics associated with the device 104 while gaining effective sensitivity. Kalman filter 216 also adapts automatically to the noise environment and forces the response to be rapid when the reflected marker ball signal is strong. Kalman filter 216 forms a feedback loop to the bi-quadratic integrator 208, which is discussed in greater detail below in relation to FIG. 3.

FIG. 3 is a more detailed block diagram illustration of the receive module shown in FIG. 2. In particular, FIG. 3 is a MATLAB model demonstrating aspects of the DSP 201 in the receive module 200 according to one invention of the present invention. As shown in FIG. 3, the matched filter component 204 includes a sine digital phase-quadrature oscillator 300 for producing the sine wave signal, a digital mixer 304, and a matched equalization filter 308. As stated above, the sine and cosine data can be generated by using the digital phase-quadrature oscillator or by a wave-table. Similarly, the matched filter component 206 includes a phase-quadrature oscillator 302 for producing a digital mixer 306 and a mathematically implemented equalization filter 310. The outputs of the filter components 204 and 206 are respectively provided as inputs to the bi-quadratic integrators 210 and 212.

The bi-quadratic integrator 210 includes mathematical gain elements 314 and 316 and the integrator 212 includes mathematical gain elements 320 and 318. Each of the integrators 210 and 212 also includes summing mechanisms 312 for combining the output of the gain elements with the output of the respective filters 308 and 310. Also included in each of the integrators 210 and 212 are delay-by-one samplers 322 and output gain elements 324. All of the gain elements are subject to modulation, within certain bounds, by the Kalman filter 216.

In more specific terms, the Kalman filter 216 analyzes the noise variance in the bandwidth of the receiver 200, typically 150 KHz. Based upon this analysis, if the noise variance is high, the Kalman filter 216 will collectively control and adjust coefficients associated with the gain elements 314, 316, 318, and 320. The coefficients will be adjusted such that if the system is noisy, based upon a predetermined threshold, the filter 216 will make the integral gain smaller. If input signals are relatively strong, based upon another predetermined threshold, the filter 216 will increase the integral gain. The trade off is that if the gain goes up, the receiver 200 achieves better response characteristics such that the detection device 104 can be physically moved around in a more rapid manner to detect marker balls. Similarly, if it is a noisy environment, the integration bandwidth will be reduced and an operator must move more slowly. The noise variance is influenced on how deep the marker balls are buried and on environmental noise.

The Kalman filter 216 operates on second order recursive coefficients, and modulates the gain of the gain elements 314, 316, 318, and 320. It measures the noise variance across the predetermined bandwidth and modulates the gain of the feedback terms, i.e., the recursive coefficients, and so doing, determines the amplitude of the filter. By virtue of putting further constraints on the parameters, the Kalman filter 216 enhances the S/N ratio.

The matched filter 204/206 and the coefficients for the bi-quadratic integrator 208 include parameters that can be externally programmed. This external programming facilitates precise control the frequency response of the electronic marker locator device. With this information, an operator can then steer the frequency response of the electronic marker locator clear of the unwanted coupling to the continuous wave line frequency, which seriously erodes the S/N ratio, thereby facilitating the simultaneous performance of the narrow band locate function and the marker ball locate function.

In the present invention, the user interface is reliant on a key-pad, LCD and speaker, located on the detection device 104. The operator is responsible for selecting the applicable marker-ball frequency and for controlling a simple high/low gain setting. The LCD bar-graph is used to convey the marker ball locator system signal amplitude along with a variable tone output from a speaker which the operator can select.

FIG. 4 illustrates a method 400 for locating marker balls according to the present invention (steps 402–412). Method 400 and its steps 402–412 can be carried out using the structure described with respect to FIGS. 2 and 3. However, the method 400 is not intended to be limited to this structure. The method 400 includes receiving a receive signal representative of a detected marker ball, the signal including I and Q components, each being centered about a first frequency (step 402). Next the I and Q components are filtererd to (i) shift the first frequency to a second frequency, thus producing second frequency I and Q components and (ii) match the second frequency I and Q components to exponential decay characteristics associated with the marker balls (steps 404). In step 406, a phase of the second frequency I and Q components is integrated to distinguish the components from noise, the integrating (i) being based upon predetermined gain coefficients and (ii) producing integrated I and Q components in accordance with the predetermined gain coefficients. In step 408, a magnitude of the integrated I and Q components is determined to produce an I and Q magnitude vector. Next, a noise variance associated with the magnitude vector is determined (step 410). Finally, the recursive coefficients are adjusted in accordance with the determined noise variance (step 412). In this way, recursive coefficients are adjusted to enhance the S/N ratio.

CONCLUSION

The present invention provides a technique for locating electronic marker balls. It capitalizes on signal processing techniques that would be either impossible or impractical in the analogue domain associated with the conventional approaches. Also, an Adaptive Kalman filter to further enhance the SIN ratio. Finally, the present invention facilitates the simultaneous performance of a narrow band locate function and an marker ball locate function.

The foregoing description of the preferred embodiments provide an illustration and description, but is not intended to be exhaustive or to limit the invention to the precise form disclosed. Modification and variations are possible consistent with the above teachings or may be acquired from practice of the invention. Thus, it is noted that the scope of the invention is defined by the claims and their equivalents.

What is claimed is:

1. An apparatus for locating electronic marker balls, comprising:

a matched filter configured to receive in-phase and quadrature-phase (I and Q) detection signals, the I and Q detection signals representative of resonant frequencies associated with one or more of the marker balls, the I and Q detection signals including a first frequency, wherein the matched filter (i) shifts the first frequency to a second frequency and (ii) matches the second frequency I and Q components to exponential decay characteristics associated with the marker balls;

a coherent integrator configured to (i) receive the matched second frequency I and Q components, (ii) integrate a phase of the matched second frequency I and Q components based upon predetermined gain coefficients, and (iii) produce an integrated signal thereby, the matching distinguishing the components from noise;

a magnitude detector coupled to the coherent integrator, wherein the magnitude detector determines a magnitude of the integrated signal and produces a magnitude vector representative of the determine magnitude; and a filter coupled to the magnitude detector, wherein the filter determines a noise variance associated with the magnitude vector and adjusts the predetermined gain coefficients.

2. The apparatus of claim 1, further comprising and analog-to-digital converter (ADC), the ADC being configured to produce a number of digital signals based upon received resonant analog signals associated with the marker balls; and a signal generation device configured to receive the digital signals and produce the I and Q detection signals therefrom.

3. The apparatus of claim 2, wherein the I and Q detection signals include burst ADC samples.

4. The apparatus of claim 3, wherein the matched filter multiplies the burst ADC samples by a predetermined amount to shift the first frequency to a second frequency.

5. The apparatus of claim 4, wherein the matched filter matches based upon at least one of a fixed wave data table and performance of a near real-time mathematical operation.

6. The apparatus of claim 1, wherein the coherent integrator is a bi-quadratic infinite impulse response filter.

7. The apparatus of claim 1, wherein the magnitude detector includes a summing mechanism.

8. The apparatus of claim 1, wherein the filter is a Kalman adaptive filter.

9. A method for locating electronic marker balls comprising:

(a) receiving a signal representative of a detected marker ball, the signal including in-phase and quadrature-phase (I and Q) components, each being centered about a first frequency;

(b) filtering the I and Q components to (i) shift the first frequency to a second frequency, thus producing second frequency I and Q components and (ii) match the second frequency I and Q components to exponential decay characteristics associated with the marker balls;

(c) integrating a phase of the matched second frequency I and Q components to distinguish the components from noise, the integrating (i) being based upon predetermined gain coefficients and (ii) producing integrated I and Q components in accordance with the predetermined gain coefficients;

(d) determining a magnitude of the integrated I and Q components to produce an I and Q magnitude vector;

(e) determining a noise variance associated with the magnitude vector; and (f) adjusting the predetermined gain coefficients in accordance with the determined noise variance.

10. The method of claim 9, wherein steps (a)–(f) facilitate simultaneous performance of narrow band and electronic marker ball locate functions.

11. The method of claim 9, wherein the predetermined gain coefficients are recursive.

12. An apparatus for locating electronic marker balls comprising:

means for receiving a signal representative of a detected marker ball, the signal including I and Q components, each being centered about a first frequency;

means for filtering the I and Q components to (i) shift the first frequency to a second frequency, thus producing second frequency I and Q components and (ii) match the second frequency I and Q components to exponential decay characteristics associated with the marker balls;

means for integrating a phase of the matched second frequency I and Q components to distinguish the components from noise, the integrating (i) being based upon predetermined gain coefficients and (ii) producing integrated I and Q components in accordance with the predetermined gain coefficients;

means for determining a magnitude of the integrated I and Q components to produce an I and Q magnitude vector;

means for determining a noise variance associated with the magnitude vector; and means for adjusting the predetermined gain coefficients in accordance with the determined noise variance.

13. The apparatus of claim 12, further comprising and analog-to-digital converting (ADC) means, the ADC means being configured to produce a number of digital signals based upon received resonant analog signals associated with the marker balls; and signal generation means configured to receive the digital signals and produce the I and Q detection signals therefrom.

14. The apparatus of claim 13, wherein the I and Q detection signals include burst ADC samples.

15. The apparatus of claim 14, wherein the means for filtering multiplies the burst ADC samples by a predetermined amount to shift the first frequency to a second frequency.

16. The apparatus of claim 15, wherein the means for filtering matches based upon at least one of a fixed wave data table and performance of a near real-time mathematical operation.

17. The apparatus of claim 12, wherein the means for integrating is a bi-quadratic infinite impulse response filter.

18. The apparatus of claim 12, wherein the means for determining a magnitude includes a summing mechanism.

19. The apparatus of claim 12, wherein the means for filtering is a Kalman adaptive filter.

20. A computer readable medium carrying one or more sequences of one or more instruction for execution by one or more processors, the instructions when executed by the one or more processors, cause the one or more processors to perform the steps of:

receiving a signal representative of a detected marker ball, the signal including in-phase and quadrature-phase (I and Q) components, each being centered about a first frequency;

filtering the I and Q components to (i) shift the first frequency to a second frequency, thus producing second frequency I and Q components and (ii) match the second frequency I and Q components to exponential decay characteristics associated with the marker balls;

integrating a phase of the matched second frequency I and Q components to distinguish the components from noise, the integrating (i) being based upon predetermined gain coefficients and (ii) producing integrated I and Q components in accordance with the predetermined gain coefficients;

determining a magnitude of the integrated I and Q components to produce an I and Q magnitude vector;

determining a noise variance associated with the magnitude vector; and adjusting the predetermined gain coefficients in accordance with the determined noise variance.

* * * * *